Figure 1:
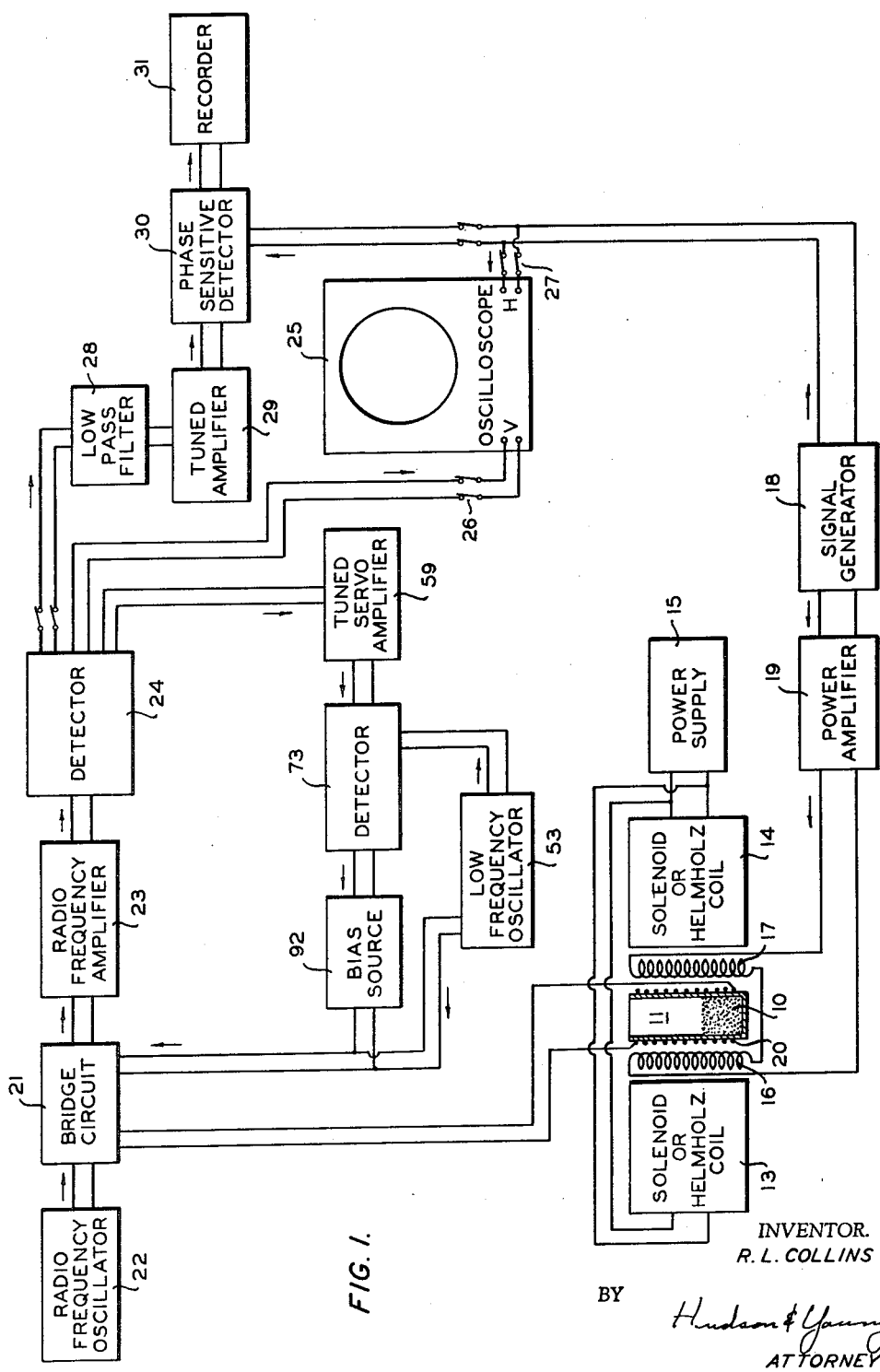

INVENTOR.
R. L. COLLINS

INVENTOR.
R. L. COLLINS

U̇nited States Patent Office 2,995,698
Patented Aug. 8, 1961

2,995,698
MAGNETIC RESONANCE SPECTROMETER
AND BRIDGE CIRCUIT
Russell L. Collins, Bartlesville, Okla., assignor to Phillips Petroleum Company, a corporation of Delaware
Filed Apr. 17, 1957, Ser. No. 653,335
5 Claims. (Cl. 324—.5)

This invention relates to an improved alternating current bridge circuit. In another aspect, it relates to a magnetic resonance spectrometer incorporating such bridge circuit.

Heretofore, changes in the values of alternating current bridge components, resulting from temperature variations and other factors, have been a serious obstacle to the use of such bridges in electronic circuits. This is particularly true where a bridge is utilized as the comparing element in a nuclear spin or paramagnetic resonance spectrometer.

In the nuclear spin type instrument, a sample is placed in a magnetic field. The sample is surrounded by a coil, the axis of which is at right angles to the magnetic field, and a radio frequency voltage is applied to this coil. If the frequency of the oscillator and the strength of the magnetic field satisfy the relation $2\pi V = |a|H$, where V is the frequency in cycles per second, $a$ is the ratio of the magnetic moment to the angular momentum of the nucleus, and H is the magnetic field intensity in gausses at the nucleus, a resonance condition exists where transitions of the particles of the sample from one quantum state of spin to another absorb a small amount of energy from the coil. The magnetic field is modulated about the resonance values at a low frequency, say 27 cycles per second, with the result that the transitions which occur each time the resonance value of the field is traversed produce a change in the impedance of the coil and an unbalance of the bridge, of which the coil constitutes an impedance element. This produces a 27 cycle modulation of the radio frequency signal fed to the bridge which can be detected, measured and utilized to determine fundamental information concerning the nuclei. Similar measurable paramagnetic resonance conditions prevail when unpaired electrons in the sample are subjected to the magnetic field, and such resonances can also be measured by the present instrument.

Where a dual element bridge, such as a twin-T bridge is utilized, either the absorptive or dispersive mode of the nuclear susceptibility can be measured by maintaining one arm of the bridge in balanced condition while slightly detuning the other arm of the bridge. The absorptive mode refers to the measurement of the imaginary component of nuclear susceptibility while the dispersive mode refers to the measurement of the real component of nuclear susceptibility.

I have discovered that operation of the instrument can be greatly improved by incorporating a voltage-sensitive capacitance in the bridge circuit and subjecting the bridge to an alternating current signal of substantially lower frequency than the radio frequency signal utilized in the resonance measurement but higher than the modulation frequency of the magnetic field. This signal having a frequency, for example, of 1,000 cycles per second is selectively amplified, converted to a direct current signal, and applied to the voltage sensitive capacitor along with a direct current bias voltage. This automatically maintains the bridge in the desired balanced condition despite temperature variations which would otherwise create substantial inaccuracies in the measurement. The importance of the automatically-balanced bridge can be further appreciated when the extremely small magnitude of the quantities to be measured is appreciated, these minute variations arising from changes in orientation of the elementary particles of the material under study with respect to the magnetic field.

Moreover, the bridge circuit with the self-balancing feature has independent utility in other instruments and circuits, and permits new adaptations of bridge techniques to plant control instrumentation problems. Also, the bridge circuit incorporating the voltage-sensitive condenser has application in the field of signal simulation. The amplitude of a measured variable is often indicated by measuring apparatus as a capacity change, which capacity changes may be simulated electrically by the use of the voltage-sensitive condenser. Finally, the voltage-sensitive condenser can be utilized to null out bridge unbalance at the signal frequency of modulation, the magnitude of the voltage fed to the condenser to maintain this null condition being proportional to the variable to be measured.

Accordingly, it is an object of the invention to provide an improved alternating current bridge circuit.

It is a further object to provide an improved magnetic resonance spectrometer incorporating a bridge circuit.

It is a still further object to provide a nuclear spin or paramagnetic resonance spectrometer which is substantially unaffected by temperature variations.

Figure 2:
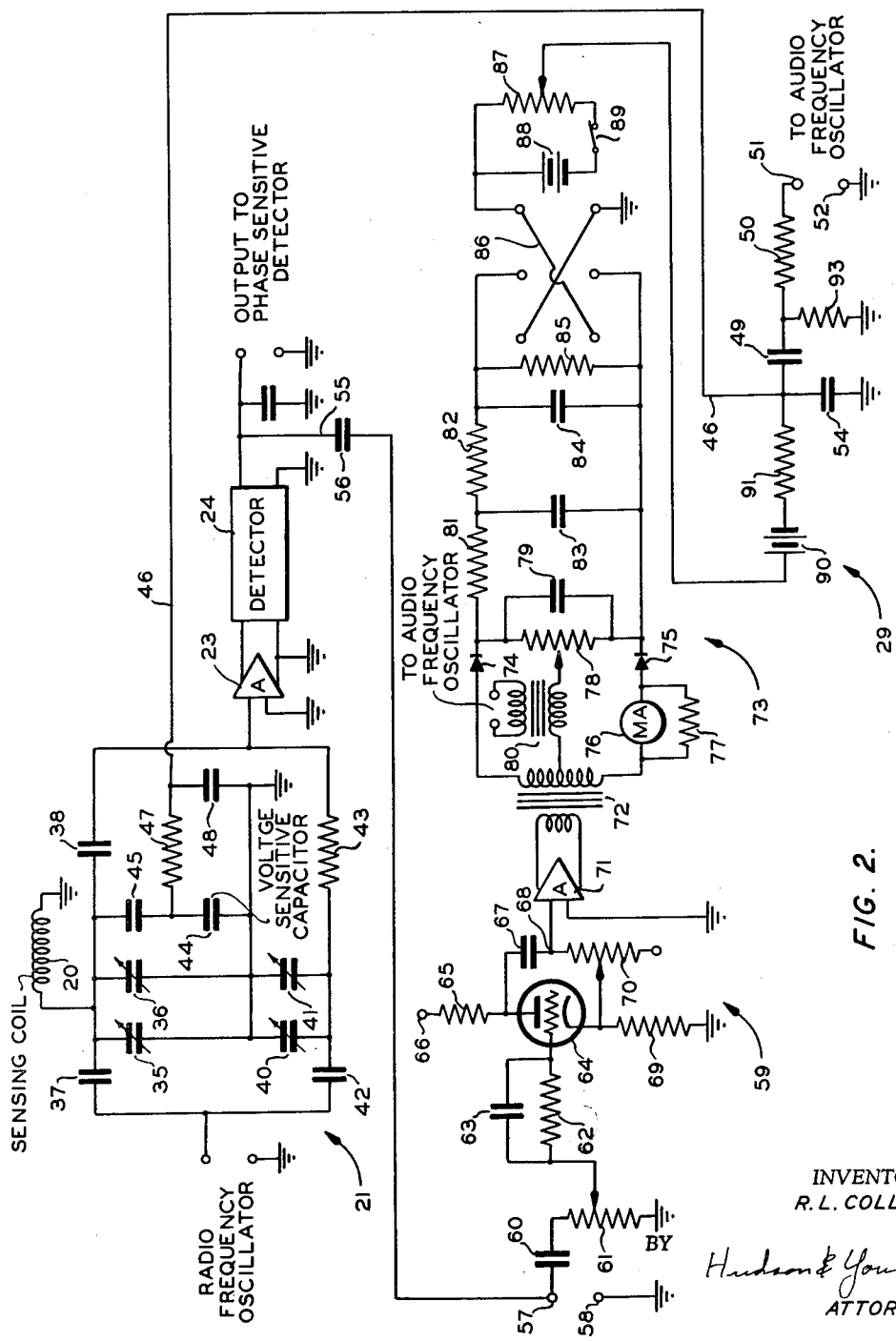

Various other objects, advantages and features of the invention will be apparent from the following detailed description taken in conjunction with the appended drawings, in which:

FIGURE 1 is a block diagram of a nuclear spin resonance spectrometer utilizing the bridge circuit of the invention; and FIGURE 2 is a schematic circuit diagram of the bridge circuit and accompanying servo amplifier.

Referring now to the drawing in detail, and particularly to FIGURE 1, a sample of material 10 to be analyzed is placed in a suitable container 11 positioned in a magnetic field produced by a pair of electromagnet coils 13 and 14. These coils are energized by a power supply 15.

A second set 16, 17 of coils is mounted between the coils 13, 14 and the container 11, these coils being energized by a signal generator 18, the output of which is fed through a power amplifier 19 to the coils 16 and 17.

It will be understood that the coils 16, 17 produce a relatively slow variation in the magnetic field produced by the coils 13 and 14. The generator 18 can produce signals of various frequencies and wave forms, such as sinusoidal wave form, a square wave or a triangular wave. It is ordinarily operated at a relatively low frequency, such as 27 or 30 cycles per second. As explained hereafter, the variations in magnetic field thus produced cause the elementary particles in the sample to periodically attain a condition of resonance, either paramagnetic resonance in the case of unpaired electrons, or nuclear resonance where the magnetic spin properties of the nuclei are to be studied. Coils 16 and 17 are shown schematically and it is to be understood that they are mounted to add or subtract from the field of coils 13 and 14, e.g., with the axis of the coils perpendicular to the paper or with the coil axis disposed in planes parallel to the plane of the drawing.

A coil 20 is wound around the container 11, the axis of this coil being inclined, preferably at a right angle, to the direction of the magnetic field produced by the coils 13, 14 and 16, 17. This coil forms an element of a bridge circuit 21 which is excited by a radio frequency oscillator 22. Preferably and advantageously, the bridge is of the twin-T type, one arm being tuned to balance and the other slightly detuned. The output is a radio frequency signal which is modulated at the frequency of the generator 18 to the extent that the bridge is unbalanced by energy loss in the coil 20. This is greatest when a condition of resonance is attained. The field created by the coils 16 and 17 varies periodically from the bias of coils 13 and 14 as explained above.

The modulated bridge output signals pass through a radio frequency amplifier 23 to a detector 24.

The signals can be visually indicated upon an oscilloscope 25 by connecting the vertical plates to the detector 24 by switches 26, and connecting the horizontal plates by switches 27 to the output of the signal generator 18.

Alternatively, the output of the detector 24 can be fed through a low pass filter 28, an amplifier 29 tuned to the frequency of the generator 18 and a phase sensitive detector 30 to a recorder 31.

It will be understood that the detector 24 produces, as an output, a signal modulated at the frequency of the generator 18, with the result that the detector 30 produces a direct current output representative of the amplitude and phase of the unbalance voltage from the bridge 21. This, in turn, is indicative of the energy absorbed in the coil 20 as a result of paramagnetic or nuclear resonance in the sample material 10.

Suitable oscillator and other component circuits are described in more detail in my copending application Serial No. 485,116, filed January 31, 1955, entitled "Magnetic Resonance Spectrometer."

Referring now to FIGURE 2, the novel bridge and servo amplifier circuits will be described in detail in conjunction with the corresponding elements indicated by block diagram in FIGURE 1. It will be noted that the bridge 21 is of the twin-T type. One T element includes a leg defined by a variable condenser 35 connected in parallel with a smaller trimmer condenser 36. The arms of the T are defined by condensers 37 and 38, the sensing coil 20 being connected between ground and the junction between condensers 37 and 38.

The other T element has a leg defined by a variable condenser 40 connected in parallel with a smaller trimmer condenser 41. The arms of the T are defined by a fixed condenser 42 and a fixed resistance 43.

In accordance with the invention, the bridge 21 further includes a voltage sensitive capacitor 44 which is connected in series with a fixed condenser 45, the two series-connected condensers, in turn, being connected in parallel with the condensers 35, 36 and the coil 20. A lead 46 is connected to the junction between condensers 44, 45 by a fixed resistance 47, and a grounded condenser 48 is connected to the lead 46.

An audio frequency voltage is applied to the bridge by the lead 46. This voltage is of substantially higher frequency than the modulation voltage produced by the generator 18, and is filtered out of the recorder channel by the low pass filter 28. A suitable frequency is 1,000 cycles per second, which is of course far lower than the frequency of the radio frequency oscillator 22. Surprisingly, the modulation of the bridge by signals of various frequency does not adversely affect either the signal reproduction nor the automatic bridge balancing hereafter described.

The lead 46 is connected through a condenser 49 and a fixed resistance 50 to a set 51, 52 of terminals which are connected to an audio frequency oscillator 53, FIGURE 1. The terminal 52 is grounded, and a grounded fixed resistance 93 is connected to the junction between parts 49 and 50 while a grounded condenser 54 is connected to the lead 46.

When the bridge circuit is unbalanced, the audio frequency voltage impressed thereon from the oscillator 53 produces an audio frequency modulation of the radio frequency output signal which is fed through the radio frequency amplifier 23 and detector 24 to a lead 55. This lead, in turn, is connected through a condenser 56 to one of a set 57, 58 of amplifier input terminals, the other input terminal being grounded. This amplifier is tuned to receive the 1,000 cycles demodulation signal from the detector 24, and is denoted generally by reference numeral 59.

The input terminal 57 is connected through a condenser 60 to one fixed terminal of a potentiometer 61, the other fixed terminal of which is grounded. The contactor of the potentiometer is connected through a fixed resistance 62 having a grid lead condenser 63 in parellel therewith to the control grid of a tube 664. Clearly, adjustment of the potentiometer 61 varies the amplitude of the signals fed to the tube 64.

The anode of the tube 64 is connected through a fixed resistance 65 to a positive power supply terminal 66 and also through a phase-shifting condenser 67 to an amplifier input terminal 68. The cathode of the tube 64 is connected to ground through a fixed bias resistance 69, and also through a variable resistance 70 to the input terminal 68.

The input terminal 68 is connected to a tuned amplifier 71 which is responsive to the frequency of the oscillator 53. Compensation for any fixed phase shift occurring in this amplifier is made by variable resistance 70 which varies the phase of the input signal.

The output of amplifier 71 is fed to the primary winding of a transformer 72 having a center tapped secondary winding. This constitutes the input circuit of a detector indicated generally by reference numeral 73. This unit includes a rectifier 74 connected to one secondary terminal and a rectifier 75 connected to the other secondary terminal through a milliammeter 76 having a fixed resistance 77 connected in parallel therewith. Also connected to the rectifiers 74, 75 is a potentiometer 78 having a condenser 79 in parallel therewith. The contactor of potentiometer 78 is connected to the center tap of transformer 72 through the primary winding of a transformer 80, the secondary winding of which is connected to the oscillator 53.

This constitutes a phase detector circuit which produces a direct current output representative of the amplitude and phase of the audio frequency component of the bridge output. This direct current signal is passed through a filter consisting of series resistances 81, 82, parallel condensers 83, 84, and a parallel resistor 85 to a reversing switch 86. Two diagonally opposite fixed terminals of the switch are grounded while the other diagonally opposite set of fixed terminals is connected to a potentiometer 87 having battery 88 and a switch 89 connected in series therewith. The contactor of the potentiometer 87 is connected through a battery 90 and a fixed resistance 91 to the lead 46. This constitutes a direct current bias source referred to generally by reference numeral 92. The switch 89 is provided so that it can be opened to prevent the battery 88 from running down when the apparatus is not in use. The reversing switch 86 is provided because one input terminal thereof will provide a stable signal whereas the other will provide an unstable or anti-stable signal. The stable signal is indicated by a smooth and continuous movement of the needle in milliammeter 76 as the frequency applied to the system is swept through its range. When this occurs the switch 86 is properly connected. On the other hand, if the needle appears to hang at one end or the other of the milliammeter scale and then to suddenly change, the switch 86 should be changed to the other position.

In operation, when the bridge 21 is unbalanced, the radio frequency signal from the oscillator 22 is modulated by a signal at the frequency of oscillator 53. This modulated signal passes through the amplifier 23 to the detector 24 where demodulation occurs. The audio frequency signal is selectively passed by the amplifier 59 and fed to the detector 73, thus producing a direct current correction voltage which is applied to the voltage-sensitive capacitor 44. The capacitance of this unit is thereby changed in the proper amount and sense as to rebalance the bridge circuits. Thus, changes in the values of the bridge components due, for example, to temperature changes, are automatically compensated for and do not unbalance the bridge circuit.

Preferably and advantageously, this correction voltage is superimposed upon a direct current bias voltage applied by the batteries 88 and 90. This prevents the error voltage appearing at lead 46 from changing polarity during normal operation of the circuit, which would otherwise occur due to the fact that the capacitance of the condenser 44 is reduced with applied voltage of either polarity. The phase of audio frequency modulating voltage determines the polarity of the correction to be applied to the condenser 44, and this phase of the output signal is taken into account upon detection of the signal by unit 73.

Highly advantageous results are obtained where the described bridge circuit is used in conjunction with the magnetic resonance spectrometer of FIGURE 1. The described bridge-balancing circuit keeps the bridge in balance despite temperature changes and provides a broad balance curve wherein the balanced condition is maintained over a much broader tuning range. Otherwise, asymmetry of the records results when the bridge becomes unbalanced. Prior to the installation of the present circuit as many as 75 percent of the records were rejected for this reason, which percentage has been reduced to less than 10 percent after incorporation of the present circuit. No deterioration of the spectrum results from the modulation of the bridge.

The instrument can be used to determine paramagnetic or nuclear spin resonance of various materials. It has great value in the analysis of polymers, especially polyethylene, and enables the crystallinity of this material to be readily and accurately determined. Indeed, the output of the instrument can be fed to an analyzer utilized to control a variable in a plant process involving the material to be analyzed, the variable being controlled so as to maintain the nuclear spin or paramagnetic resonance at a predetermined value.

When utilized with the nuclear spin resonance spectrometer, suitable values for the bridge components are as follows:

Condensers 37, 42_ 1 mmf.
Condenser 38_____ 3 mmf.
Resistor 43_____ 100 ohms.
Condenser 35_____ 6 to 100 mmf.
Condenser 36_____ Trimmer condenser consisting of one rotor plate and one stator plate.
Condenser 40_____ 5 to 75 mmf.
Condenser 41_____ Trimmer condenser consisting of one rotor plate and two stator plates.
Condenser 44_____ 100 mmf. voltage-sensitive capacitor.
Condenser 48_____ 100 mmf.
Resistor 47_____ 47,000 ohms.

While the invention has been described in connection with a present, preferred embodiment thereof, it is to be understood that this description is illustrative only and is not intended to limit the invention.

I claim:

1. An alternating current bridge circuit comprising, in combination, an alternating current source, a set of output terminals, and a plurality of impedances connected in circuit with said source and terminals to provide a network which can be balanced, one of said impedances being a capacitor having a capacitance which varies in accordance with the voltage impressed thereon, means for impressing an alternating current on the bridge of a substantially different frequency than that of said current source, means responsive to an unbalance voltage of said different frequency appearing across said output terminals, a phase-sensitive detector connected to receive said unbalance voltage and to produce a direct voltage representative thereof, means for applying a bias voltage to said capacitor, and means to apply said direct voltage to said capacitor, thereby to automatically maintain said bridge in balanced condition.

2. An alternating current bridge circuit comprising, in combination, an alternating current source, a plurality of impedances arranged to form a twin-T bridge with said source and having output terminals, said source being connected to one arm and the base of each T, and said output terminals being connected to the other arm and base of each T, a voltage-sensitive capacitor connected in parallel with the base of one T, means to impress an alternating voltage of frequency substantially lower than the frequency of said source upon the bridge whereby an unbalance voltage of said different frequency appears across said output terminals when the bridge is unbalanced, an amplifier tuned to said different frequency connected to said output terminal, a phase sensitive detector connected to said amplifier to produce a direct voltage representative of the phase and magnitude of said output voltage, and means connecting the output of said detector to said voltage-sensitive capacitor.

3. An alternating current bridge circuit comprising, in combination, an alternating current source, a plurality of impedances arranged to form a twin-T bridge with said source and having output terminals, said source being connected to one arm and the base of each T, and said output terminals being connected to the other arm and base of each T, a voltage-sensitive capacitor connected in parallel with the base of one T, means to impress an alternating voltage of frequency substantially lower than the frequency of said source upon the bridge whereby an unbalance voltage having a comp nent of said different frequency appears across said output terminals when the bridge is unbalanced, an amplifier tuned to said different frequency connected to said output terminals, a phase-shifting circuit connected to the output of said amplifier, means for manually varying the phase-shift produced by said circuit, a phase-sensitive detector connected to said amplifier to produce a direct voltage representative of the phase and magnitude of said output voltage, means for connecting the output of said detector to said voltage-sensitive capacitor, and means for impressing a direct bias voltage upon said capacitor.

4. In an instrument for the detection of resonance, a container to receive a material to be analyzed, a coil wound about said container, means for establishing a variable magnetic field in the region of said container in a direction inclined to the axis of said coil, an alternating current bridge circuit defined by a radio frequency alternating current source, a set of output terminals, and a plurality of impedances connected in a circuit with said source and terminals to provide a bridge network which can be balanced, one of said impedances being said coil, another of said impedances being a capacitor having a capacitance which varies in accordance with the voltage impressed thereon, means for applying an alternating voltage to said bridge of substantially lower frequency than the frequency of said source, a tuned amplifier responsive to the signal appearing across said output terminals which is selectively responsive to signals of said lower frequency, a detector connected to the output of the last-mentioned amplifier, said detector being constructed and arranged to produce a direct current output representative of the magnitude and phase of said lower frequency signal, means to impress said direct voltage upon said voltage-sensitive capacitor, and means to impress a direct current bias voltage upon said capacitor.

5. The instrument of claim 4 wherein the bridge is of the twin-T type, the radio frequency source being connected between one arm and the leg of each T, the output terminals being connected to the other arms and leg of each T.

(References on following page)

References Cited in the file of this patent

UNITED STATES PATENTS

| | | |
|---|---|---|
| 2,191,315 | Guanella | Feb. 20, 1940 |
| 2,243,921 | Rust et al. | June 3, 1941 |
| 2,440,283 | Levy | Apr. 27, 1948 |
| 2,443,094 | Carlson et al. | June 8, 1948 |
| 2,462,599 | Blumlein et al. | Feb. 22, 1949 |
| 2,476,496 | Kliever | July 9, 1949 |
| 2,760,158 | Kerns | Aug. 21, 1956 |
| 2,772,391 | Mackey | Nov. 27, 1956 |

FOREIGN PATENTS

| | | |
|---|---|---|
| 585,790 | Great Britain | Feb. 25, 1947 |
| 745,873 | Great Britain | Mar. 7, 1956 |

OTHER REFERENCES

Anderson: Physical Review, vol. 76, No. 10, Nov. 15, 1949, pp. 1460 to 1464.

Andrew: Nuclear Magnetic Resonance, published 1955 by Cambridge Press, pp. 40 to 49.